(12) United States Patent
Maeda et al.

(10) Patent No.: US 8,598,274 B2
(45) Date of Patent: Dec. 3, 2013

(54) METHOD FOR PRODUCING MODIFIED CONJUGATED DIENE-BASED POLYMER, AND METHOD FOR PRODUCING VULCANIZED POLYMER

(75) Inventors: Naoaki Maeda, Kobe (JP); Hisakatsu Hama, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/544,048

(22) Filed: Jul. 9, 2012

(65) Prior Publication Data

US 2013/0018151 A1    Jan. 17, 2013

(30) Foreign Application Priority Data

Jul. 13, 2011    (JP) .................................. 2011-154570

(51) Int. Cl.
*C08F 8/42*    (2006.01)
*C08F 279/02*    (2006.01)

(52) U.S. Cl.
USPC ............ 525/102; 525/192; 525/194; 525/254

(58) Field of Classification Search
None
See application file for complete search history.

(56) References Cited

U.S. PATENT DOCUMENTS

| | | | | |
|---|---|---|---|---|
| 3,322,738 | A * | 5/1967 | Uraneck et al. | 526/83 |
| 4,647,625 | A * | 3/1987 | Aonuma et al. | 525/232 |
| 5,189,109 | A | 2/1993 | Imai et al. | |
| 7,339,005 | B2 * | 3/2008 | Oshima et al. | 525/331.9 |
| 7,625,981 | B2 * | 12/2009 | Inagaki et al. | 525/192 |
| 2005/0159554 | A1 * | 7/2005 | Endou et al. | 525/242 |
| 2006/0004143 | A1 | 1/2006 | Inagaki et al. | |
| 2010/0048806 | A1 | 2/2010 | Inagaki et al. | |

FOREIGN PATENT DOCUMENTS

JP    01-217047 A    8/1989
JP    2005-344039 A    12/2005

* cited by examiner

*Primary Examiner* — Robert S Loewe
(74) *Attorney, Agent, or Firm* — Panitch Schwarze Belisario & Nadel LLP

(57) ABSTRACT

A method for producing a modified conjugated diene-based polymer, wherein the method comprises:
a first step of producing a conjugated diene-based polymer by polymerizing monomers comprising a conjugated diene compound in a hydrocarbon solvent using an organoalkali metal compound and
a second step of adding (I) a compound having a carbonyl group and a substituted amino group and (II) a compound represented by Formula (II-A) to a hydrocarbon solvent containing the conjugated diene-based polymer.

(II-A)

[Structural formula showing a six-membered ring with three carbonyl groups and three nitrogens, with substituents $R^2-Si(R^1)(R^3)-(CH_2)_k-$ on one nitrogen, $-(CH_2)_l-Si(R^{11})(R^{12})(R^{13})$ on another nitrogen, and $-(CH_2)_m-Si(R^{14})(R^{15})(R^{16})$ on the third nitrogen]

7 Claims, No Drawings

METHOD FOR PRODUCING MODIFIED CONJUGATED DIENE-BASED POLYMER, AND METHOD FOR PRODUCING VULCANIZED POLYMER

BACKGROUND OF THE INVENTION

1. Field of the Invention

The present invention relates to a method for producing a modified conjugated diene-based polymer, and a method for producing a vulcanized polymer.

2. Description of the Related Art

With the increased interest in environmental problems, requirements for fuel saving of automobiles have recently increased, and it has been requested for a rubber composition to be used in an automobile tire to be superior in fuel economy. A rubber composition containing a conjugated diene-based polymer such as polybutadiene or styrene-butadiene copolymer, and a reinforcing agent is used as a rubber composition for an automobile tire, and a conjugated diene-based polymer to be used as a rubber component has been studied so as to improve performances as a rubber composition for a tire.

For example, JP-A-1-217047 proposes a conjugated diene-based polymer in which a butadiene-styrene copolymer is modified with an acrylamide compound wherein a dialkylamino group is combined with a nitrogen atom of acrylamide via an alkylene group. JP-A-2005-344039 proposes a conjugated diene-based polymer in which a butadiene-styrene copolymer is modified with an isocyanurate compound wherein a trialkoxysilyl group is combined with a nitrogen atom of an isocyanurate group via an alkylene group.

However, a rubber composition containing the above modified conjugated diene-based polymer was still unsatisfactory in fuel economy.

SUMMARY OF THE INVENTION

Under these circumstances, an object to be achieved by the present invention is to provide a method for producing a modified conjugated diene-based polymer suitable for a raw material of a rubber composition which is superior in fuel economy.

The present invention relates to a method for producing a modified conjugated diene-based polymer, wherein the method comprises:

a first step of producing a conjugated diene-based polymer by polymerizing monomers comprising a conjugated diene compound in a hydrocarbon solvent using an organoalkali metal compound and a second step of adding (I) a compound having a carbonyl group and a substituted amino group and (II) a compound represented by Formula (II-A) to a hydrocarbon solvent containing the conjugated diene-based polymer:

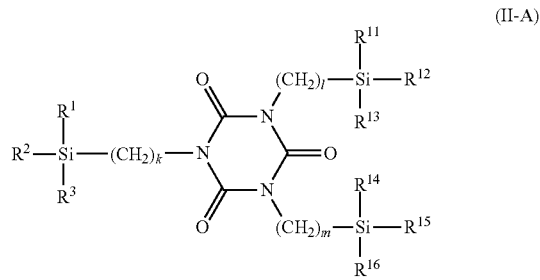

(II-A)

wherein k, l and m are each an integer of 1 to 8; $R^1$, $R^2$, $R^3$, $R^{11}$, $R^{12}$, $R^{13}$, $R^{14}$, $R^{15}$ and $R^{16}$ are each independently a hydrocarbyloxy group or a hydrocarbyl group; at least one group selected from among $R^1$, $R^2$ and $R^3$ is a hydrocarbyloxy group; at least one group selected from among $R^{11}$, $R^{12}$ and $R^{13}$ is a hydrocarbyloxy group; and at least one group selected from among $R^{14}$, $R^{15}$ and $R^{16}$ is a hydrocarbyloxy group.

In its second aspect, the present invention relates to a method for producing a vulcanizable polymer, the method comprising kneading a modified conjugated diene-based polymer produced by the above method and a vulcanizing agent in an amount of from 0.1 to 15 parts by weight per 100 parts by weight of the modified conjugated diene-based polymer.

In its third aspect, the present invention relates to a method for producing a vulcanized polymer, the method comprising heating a vulcanizable polymer obtained by the above method.

According to the present invention, it is possible to provide a modified conjugated diene-based polymer suitable for a raw material of a rubber composition, which is superior in fuel economy.

DETAILED DESCRIPTION OF THE PREFERRED EMBODIMENTS

In the present specification, a hydrocarbyl group represents a monovalent group having a structure in which one hydrogen atom has been removed from a hydrocarbon. A hydrocarbylene group represents a divalent group having a structure in which two hydrogen atoms have been removed from a hydrocarbon. A hydrocarbyloxy group represents a monovalent group having a structure in which a hydrocarbyl group is combined with an oxygen atom. A substituted amino group represents a group in which one or, more hydrogen atoms on an amino group are substituted with a substituent.

The present invention provides a method for producing a modified conjugated diene-based polymer, which comprises a first step of producing a conjugated diene-based polymer by polymerizing monomers comprising a conjugated diene compound in a hydrocarbon solvent using an organoalkali metal compound, and a second step of adding (I) a compound having a carbonyl group and a substituted amino group and (II) a compound represented by Formula (II-A) to a hydrocarbon solvent containing the conjugated diene-based polymer:

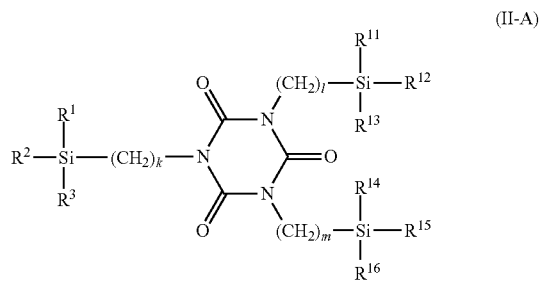

(II-A)

wherein k, l and m are each an integer of 1 to 8; $R^1$, $R^2$, $R^3$, $R^{11}$, $R^{12}$, $R^{13}$, $R^{14}$, $R^{15}$ and $R^{16}$ are each independently a hydrocarbyloxy group or a hydrocarbyl group; at least one group selected from among $R^1$, $R^2$ and $R^3$ is a hydrocarbyloxy group; at least one group selected from among $R^{11}$, $R^{12}$ and $R^{13}$ is a hydrocarbyloxy group; and at least one group selected from among $R^{14}$, $R^{15}$ and $R^{16}$ is a hydrocarbyloxy group.

<First Step>

A conjugated diene-based polymer is obtained by polymerizing monomers comprising a conjugated diene compound in a hydrocarbon solvent, using an organoalkali metal compound as a polymerization initiator.

The conjugated diene compound includes 1,3-butadiene, isoprene, 1,3-pentadiene, 2,3-dimethyl-1,3-butadiene and 1,3-hexadiene, and is preferably 1,3-butadiene or isoprene.

The monomers preferably contains, in addition to the conjugated diene compound, aromatic vinyl compounds so as to obtain a polymer having high tensile strength. The aromatic vinyl compound includes styrene, α-methylstyrene, vinyltoluene, vinylnaphthalene, divinylbenzene, trivinylbenzene, divinylnaphthalene and the like, and is preferably styrene.

The amount of the aromatic vinyl compound to be used in polymerization is preferably 10% by weight or more, and more preferably 15% by weight or more, based on 100% by weight of the total amount of monomers to be used in the polymerization. In order to enhance fuel economy, the amount of the aromatic vinyl compound is preferably 50% by weight or less, and more preferably 45% by weight or less.

The amount of the conjugated diene compound to be used in polymerization is preferably 50% by weight or more, and more preferably 55% by weight or more, based on 100% by weight of the total amount of monomers to be used in the polymerization. The amount of the conjugated diene compound is preferably 90% by weight or less, and more preferably 85% by weight or less.

The hydrocarbon solvent is a solvent which does not deactivate an organoalkali metal compound. Examples of the hydrocarbon solvent include aliphatic hydrocarbons such as propane, butane, isobutane, pentane, isopentane and hexane; aromatic hydrocarbons such as benzene, toluene, xylene and ethylbenzene; and alicyclic hydrocarbons such as cyclopentane and cyclohexane. One or more kinds of these hydrocarbon solvents are used.

The organoalkali metal compound is a compound which has a direct bond between a carbon atom and an alkali metal atom. Examples of the organoalkali metal compound include an organolithium compound, an organosodium compound, an organopotassium compound, an organorubidium compound, an organocesium compound and the like. Examples of the organolithium compound include a hydrocarbyllithium compound and a hydrocarbylenedilithium compound. Examples of the organosodium compound include sodium naphthalenide and sodium biphenylide. Examples, of the organopotassium compound include potassium naphthalenide.

Examples of the hydrocarbyllithium compound include an alkyllithium compound such as methyllithium, ethyllithium, propyllithium, isopropyllithium, n-butyllithium, isobutyllithium, sec-butyllithium, tert-butyllithium, tert-octyllithium or n-decyllithium; an aryllithium compound such as phenyllithium, 2-naphthyllithium or 2-butylphenyllithium; an arylalkyllithium compound such as 4-phenylbutyllithium; and a cycloalkyllithium compound such as cyclopentyllithium or cyclohexyllithium. The hydrocarbyllithium compound is preferably an alkyllithium compound, and more preferably n-butyllithium or sec-butyllithium.

Examples of the hydrocarbylenedilithium compound include 1,4-dilithio-2-butene, 1,3-bis (1-lithio-1,3-dimethylpentyl)benzene and the like.

The amount of the organoalkali metal compound to be used in polymerization of monomers is preferably from 0.01 mmol to 15 mmol based on 100 g of monomers to be used in the polymerization.

Monomers may be polymerized in the presence of an agent for adjusting the vinyl bond content of a monomer unit derived from a conjugated diene compound, and an agent for adjusting distribution of a monomer unit derived from a conjugated diene compound and a monomer unit derived from compounds other than the conjugated diene compound in the conjugated diene-based polymer chain (hereinafter collectively referred to as an "adjusting agent"). Examples of the adjusting agent include an ether compound, a tertiary amine, a phosphine compound, an alkali metal alkoxide and an alkali metal phenoxide. Examples of the ether compound include a cyclic ether such as tetrahydrofuran, tetrahydropyran or 1,4-dioxane; an aliphatic monoether such as diethyl ether or dibutyl ether; an aliphatic diether such as ethylene glycol dimethyl ether, ethylene glycol diethyl ether or ethylene glycol dibutyl ether; an aliphatic triether such as diethylene glycol diethyl ether or diethylene glycol dibutyl ether; and an aromatic ether such as diphenyl ether or anisole. Examples of the tertiary amine include triethylamine, tripropylamine, tributylamine, 1,1,2,2-tetramethylethylenediamine, N,N-diethylaniline, pyridine, quinoline and the like. Examples of the phosphine compound include trimethylphosphine, triethylphosphine, triphenylphosphine and the like. Examples of the alkali metal alkoxide include sodium-tert-butoxide, potassium-tert-butoxide, sodium-tert-pentoxide and potassium-tert-pentoxide. Examples of the alkali metal phenoxide include sodium phenoxide and potassium phenoxide. One or more kinds of these adjusting agents can be used.

In polymerizing monomers, the respective monomers may be supplied to a polymerization reactor at a time, or continuously supplied, or intermittently supplied. The respective monomers may be supplied to a polymerization reactor at different stage, or supplied simultaneously.

In polymerizing monomers, the polymerization temperature is usually 25° C. or higher, preferably 35° C. or higher, and more preferably 50° C. or higher. Also, the polymerization temperature is usually 100° C. or lower, preferably 90° C. or lower, and more preferably 80° C. or lower. The polymerization time is usually from 10 minutes to 5 hours.

The conjugated diene-based polymer, which is obtained by polymerizing monomers in a hydrocarbon solvent using an organoalkali metal compound as a polymerization initiator, is usually a conjugated diene-based polymer in which at least one end of polymer chain ends undergoes alkali metalization.
<Second Step>

In the method for producing a modified conjugated diene-based polymer of the present invention, after obtaining the conjugated diene-based polymer by the above method, the compound (I) having a carbonyl group and a substituted amino group and the compound (II) represented by Formula (II-A) are added to a hydrocarbon solvent containing the conjugated diene-based polymer to obtain a modified conjugated diene-based polymer:

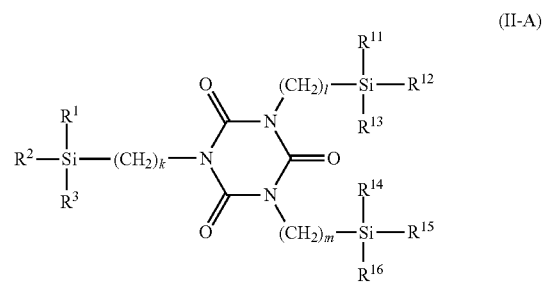

(II-A)

wherein k, l and m are each an integer of 1 to 8; $R^1$, $R^2$, $R^3$, $R^{11}$, $R^{12}$, $R^{13}$, $R^{14}$, $R^{15}$ and $R^{16}$ are each independently hydrocarbyloxy group or hydrocarbyl group; at least one group selected from among $R^1$, $R^2$ and $R^3$ is a hydrocarbyloxy group; at least one group selected from among $R^{11}$, $R^{12}$ and $R^{13}$ is a hydrocarbyloxy group; and at least one group selected from among $R^{14}$, $R^{15}$ and $R^{16}$ is a hydrocarbyloxy group.

Examples of the hydrocarbon solvent include compounds described as the hydrocarbon solvent in the <first step>. The hydrocarbon solvent in the second step may be the hydrocarbon solvent used in the first step. Namely, after obtaining a conjugated diene-based polymer by polymerizing monomers comprising a conjugated diene compound in a hydrocarbon solvent using an organoalkali metal compound in the first step, the compounds (I) and (II) may be subsequently added to the solvent.

After separating the conjugated diene-based polymer obtained in the first step from the solvent, the conjugated diene-based polymer may be added to a hydrocarbon solvent which is different from the solvent used in the first step. In this case, the solvent used in the first step and the hydrocarbon solvent, to which the conjugated diene-based polymer is added, may be the same or different.

Examples of the substituted amino group of the compound (I) include a dialkylamino group such as an N,N-dimethylamino group, an N,N-diethylamino group, an N,N-di(n-propyl)amino group, an N,N-di(isopropyl)amino group, an N,N-di (n-butyl) amino group, an N,N-d (sec-butyl)amino group, an N,N-di (tert-butyl)amino group, an N,N-di(neopentyl) amino group or an N-ethyl-N-methylamino group; an alkylaralkylamino group such as a benzylamino group; an alkylarylamino group such as an N-methyl-N-phenylamino group; a diarylamino group such as an N,N-diphenylamino group; an alkylideneamino group such as an ethylideneamino group, a 1-methylethylideneamino group, a 2-methylpropylideneamino group or a 1,3-dimethylbutylideneamino group; and a cyclic amino group such as a 1-aziridinyl group, a 1-azetidinyl group, a 1-pyrrolidinyl group, a 1-piperidinyl group, a 1-hexamethyleneimino group, a 1-heptamethyleneimino group, a 1-pyrrolyl group, a 1-imidazolidinyl group, a 1-imidazolyl group, a 4,5-dihydro-1-imidazolyl group, a 1-pyrazolidinyl group, a 1-pyrazolyl group, a 1-piperazinyl group or a morpholino group.

The Compound (I) is preferably a compound represented by Formula (I-A) shown below:

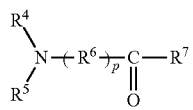

(I-A)

wherein $R^4$ is an optionally substituted hydrocarbyl group, a hydrocarbylene group which may have a nitrogen atom and/ or an oxygen atom where $R^4$ is combined with $R^5$, or a divalent group where $R^4$ is combined with $R^7$; $R^5$ is an optionally substituted hydrocarbyl group, or a hydrocarbylene group which may have a nitrogen atom and/or an oxygen atom where $R^5$ is combined with $R^4$; $R^7$ is an optionally substituted hydrocarbyl group, a hydrogen atom, or a divalent group where $R^7$ is combined with $R^4$. $R^6$ is a divalent group, and p is 0 or 1.

In Formula (I-A), the optionally substituted hydrocarbyl group of $R^4$, $R^5$ and $R^7$ is a hydrocarbyl group or a substituted hydrocarbyl group. Examples of the substituted hydrocarbyl group include a substituted hydrocarbyl group in which a substituent is a hydrocarbyloxy group, and a substituted hydrocarbyl group in which a substituent is a substituted amino group. Examples of the hydrocarbyl group include an alkyl group such as a methyl group, an ethyl group, an n-propyl group, an isopropyl group or an n-butyl group; an alkenyl group such as a vinyl group, an allyl group or an isopropenyl group; and an aryl group such as a phenyl group. Examples of the substituted hydrocarbyl group in which a substituent is a hydrocarbyloxy group include a hydrocarbyloxyalkyl group such as a methoxymethyl group, an ethoxymethyl group or an ethoxyethyl group. Examples of the substituted hydrocarbyl group in which a substituent is a substituted amino group include an (N,N-dialkylamino)alkyl group such as a 2-(N,N-dimethylamino)ethyl group, a 2-(N,N-diethylamino)ethyl group, a 3-(N,N-dimethylamino)propyl group or a 3-(N,N-diethylamino)propyl group; a (N,N-dialkylamino)aryl group such as a 4-(N,N-dimethylamino)phenyl group, a 3-(N,N-dimethylamino)phenyl group, a 4-(N,N-diethylamino)phenyl group or a 3-(N,N-diethylamino)phenyl group; a (N,N-dialkylamino)alkylaryl group such as a 4-(N,N-dimethylamino)methylphenyl group or a 4-(N,N-dimethylamino)ethylphenyl group; a cyclic amino group-containing alkyl group such as a 3-pyrrolidinopropyl group, a 3-piperidinopropyl group or a 3-imidazolylpropyl group; a cyclic amino group-containing aryl group such as a 4-pyrrolidinophenyl group, a 4-piperidinophenyl group or a 4-imidazolylphenyl group; and a cyclic amino group-containing alkylaryl group such as a 4-pyrrolidinoethylphenyl group, a 4-piperidinoethylphenyl group or a 4-imidazolylethylphenyl group.

Where $R^4$ is combined with $R^5$, $R^4$ is a hydrocarbylene group which may have a nitrogen atom and/or an oxygen atom. Where $R^5$ is combined with $R^4$, $R^5$ is a hydrocarbylene group which may have a nitrogen atom and/or an oxygen atom. Examples of the hydrocarbylene group include an alkanediyl group, an alkenediyl group and an arylene group. Examples of the alkanediyl group include a polymethylene group such as a trimethylene group, a tetramethylene group, a pentamethylene group or a hexamethylene group; and a 2,2,4-trimethylhexane-1,6-diyl group. Examples of the alkenediyl group include a pentane-2-ene-1,5-diyl group. Examples of the arylene group include a 1,4-phenylene group. The hydrocarbylene group having a nitrogen atom and/or an oxygen atom is a hydrocarbylene group having a nitrogen atom, a hydrocarbylene group having an oxygen atom, or a hydrocarbylene group having a nitrogen atom and an oxygen atom. Examples of the hydrocarbylene group having a nitrogen atom include a group represented by —CH=N—CH=CH— and a group represented by —CH=N—CH$_2$—CH$_2$—. Examples of the hydrocarbylene group having an oxygen atom include a group represented by —(CH$_2$)$_S$—O—(CH$_2$)$_t$— (s and t each independently represent an integer of 1 or more).

Where $R^4$ is combined with $R^7$, $R^4$ is a divalent group. Where $R^7$ is combined with $R^4$, $R^7$ is a divalent group. $R^6$ is a divalent group. Examples of the divalent group include a hydrocarbylene group, a hydrocarbylene group having a nitrogen atom, a hydrocarbylene group having an oxygen atom, a group in which a hydrocarbylene group is combined with an oxygen atom, and a group in which a hydrocarbylene group is combined with a group represented by —NR$^8$— ($R^8$ represents a hydrocarbyl group or a hydrogen atom). Examples of the hydrocarbylene group include an alkanediyl group, an alkenediyl group and an arylene group. Examples of the alkanediyl group include a polymethylene group such as a trimethylene group, a tetramethylene group, a pentamethylene group or a hexamethylene group; and a 2,2,4-trimethylhexane-1,6-diyl group. Examples of the alkenediyl group include a pentane-2-ene-1,5-diyl group. Examples of the arylene group include a 1,4-phenylene group. Examples of the hydrocarbylene group having a nitrogen atom include a group represented by —CH=N—CH=CH— and a group represented by —CH=N—CH$_2$—CH$_2$—. Examples of the hydrocarbylene group having an oxygen atom include a group represented by —(CH$_2$)$_s$—O—(CH$_2$)$_t$— (s and t each independently represent an integer of 1 or more). Examples of the group in which a hydrocarbylene group is combined with an oxygen atom include a group represented by —(CH$_2$)$_r$—O— (r represents an integer of 1 or more).

Examples of the group in which a hydrocarbylene group is combined with a group represented by —NR$^8$— (R$^8$ represents a hydrocarbyl group or a hydrogen atom) include a group represented by —(CH$_2$)$_q$—NR$^8$— (q represents an integer of 1 or more). R$^8$ is preferably a hydrocarbyl group having 1 to 6 carbon atoms, or a hydrogen atom.

The compound represented by Formula (I-A) is preferably a compound represented by (I-A1):

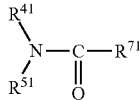

(I-A1)

wherein R$^{41}$ is an optionally substituted hydrocarbyl group, or a hydrocarbylene group which may have a nitrogen atom and/or an oxygen atom where R$^{41}$ is combined with R$^{51}$; R$^{51}$ is an optionally substituted hydrocarbyl group, or a hydrocarbylene group which may have a nitrogen atom and/or an oxygen atom where R$^{51}$ is combined with R$^{41}$; and R$^{71}$ is an optionally substituted hydrocarbyl group or a hydrogen atom.

Description and examples of the optionally substituted hydrocarbyl group in Formula (I-A1) are the same as those of an optionally substituted hydrocarbyl group in Formula (I-A).

Description and examples of the hydrocarbylene group which may have a nitrogen atom and/or an oxygen atom in Formula (I-A1) are the same as those of a hydrocarbylene group which may have a nitrogen atom and/or an oxygen atom in Formula (I-A).

In Formula (I-A1), R$^{41}$ is preferably a hydrocarbyl group having 1 to 10 carbon atoms, or a hydrocarbylene group having 3 to 10 carbon atoms which is combined with R$^{51}$ or a hydrocarbylene group having 3 to 10 carbon atoms which has a nitrogen atom and which is combined with R$^{51}$. More preferably, R$^{41}$ is an alkyl group having 1 to 10 carbon atoms or an aryl group having 6 to 10 carbon atoms, or a polymethylene group having 3 to 10 carbon atoms which is combined with R$^{51}$, a group represented by —CH=N—CH=CH— which is combined with R$^{51}$, or a group represented by —CH=N—CH$_2$—CH$_2$— which is combined with R$^{51}$. Still more preferably, R$^{41}$ is an alkyl group having 1 to 6 carbon atoms. Particularly preferably, R$^{41}$ is a methyl group or an ethyl group.

In Formula (I-A1), R$^{51}$ is preferably a hydrocarbyl group having 1 to 10 carbon atoms, or a hydrocarbylene group having 3 to 10 carbon atoms which is combined with R$^{41}$, or a hydrocarbylene group having 3 to 10 carbon atoms which has a nitrogen atom and which is combined with R$^{41}$. More preferably, R$^{51}$ is an alkyl group having 1 to 10 carbon atoms or an aryl group having 6 to 10 carbon atoms, or a polymethylene group having 3 to 10 carbon atoms which is combined with R$^{41}$, a group represented by —CH=N—CH=CH— which is combined with R$^{41}$, or a group represented by —CH=N—CH$_2$—CH$_2$— which is combined with R$^{41}$. Still more preferably, R$^{51}$ is an alkyl group having 1 to 6 carbon atoms. Particularly preferably, R$^{51}$ is a methyl group or an ethyl group.

In Formula (I-A1), R$^{71}$ is preferably a hydrocarbyl group or a hydrogen atom, more preferably a hydrocarbyl group having 1 to 10 carbon atoms or a hydrogen atom, still more preferably an alkyl group having 1 to 6 carbon atoms, an alkenyl group having 2 to 6 carbon atoms or a hydrogen atom, and particularly preferably a hydrogen atom, a methyl group, an ethyl group or a vinyl group.

Examples of the compound in which R$^{71}$ is a hydrocarbyl group among the compounds represented by Formula (I-A1) include N,N-dihydrocarbylacetamide such as N,N-dimethylacetamide, N,N-diethylacetamide or N-methyl-N-ethylacetamide; N,N-dihydrocarbylacrylamide such as N,N-dimethylacrylamide, N,N-diethylacrylamide or N-methyl-N-ethylacrylamide; and N,N-dihydrocarbylmethacrylamide such as N,N-dimethylmethacrylamide, N,N-diethylmethacrylamide or N-methyl-N-ethylmethacrylamide.

Examples of the compound in which R$^{71}$ is a hydrogen atom among the compounds represented by Formula (I-A1) include N,N-dihydrocarbylformamide such as N,N-dimethylformamide, N,N-diethylformamide or N-methyl-N-ethylformamide.

The compound represented by Formula (I-A) is preferably a compound represented by (1-A2):

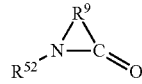

(I-A2)

wherein R$^{52}$ is an optionally substituted hydrocarbyl group; R$^9$ is a group in which a hydrocarbylene group is combined with a group represented by —NR$^8$—, or a hydrocarbylene group; and R$^8$ is a hydrocarbyl group or a hydrogen atom.

Description and examples of the optionally substituted hydrocarbyl group in Formula (I-A2) are the same as those of an optionally substituted hydrocarbyl group in Formula (I-A).

Examples of the group of R$^9$ in which a hydrocarbylene group is combined with a group represented by —NR$^8$— in Formula (I-A2) include a group represented by —(CH$_2$)$_q$—NR$^8$— (q represents an integer of 1 or more).

In the group represented by —NR$^8$—, where R$^8$ is a hydrocarbyl group, the number of carbon atom of R$^8$ is preferably from 1 to 8. In the group represented by —NR$^8$—, R$^8$ is preferably a methyl group.

Examples of the hydrocarbylene group of R$^9$ include an alkanediyl group, an alkenediyl group and an arylene group. Examples of the alkanediyl group include a polymethylene group such as a trimethylene group, a tetramethylene group, a pentamethylene group or a hexamethylene group; and a 2,2,6-trimethylhexane-1,6-diyl group. Examples of the alkenediyl group include a pent-2-ene-1,5-diyl group. Examples of the arylene group include a 1,4-phenylene group.

In Formula (I-A2), R$^{52}$ is preferably a hydrocarbyl group having 1 to 10 carbon atoms, more preferably an alkyl group having 1 to 10 carbon atoms or an aryl group having 6 to 10 carbon atoms, still more preferably an alkyl group having 1 to 6 carbon atoms or a phenyl group, and particularly preferably a methyl group, an ethyl group or a phenyl group.

In Formula (I-A2), R$^9$ is preferably a hydrocarbylene group having 1 to 10 carbon atoms, or a group in which a hydrocarbylene group having 1 to 10 carbon atoms is combined with a group represented by —NR$^8$— (R$^8$ represents a hydrocarbyl group or a hydrogen atom), more preferably a polymethylene group having 3 to 6 carbon atoms or a group represented by —$(CH_2)_q$—$NR^8$— ($R^8$ represents a hydrocarbyl group, and q represents an integer of 2 to 5), and still more preferably a trimethylene group, a tetramethylene group, a pentamethylene group, or a group represented by —$(CH_2)_2$—$N(CH_3)$—.

Examples of the compound in which $R^9$ is a group in which a hydrocarbylene group is combined with a group represented by —$NR^8$— ($R^8$ represents a hydrocarbyl group or a hydrogen atom) among the compounds represented by Formula (I-A2) include 1,3-dihydrocarbyl-2-imidazolidinone such as 1,3-dimethyl-2-imidazolidinone, 1,3-diethyl-2-imidazolidinone, 1,3-divinyl-2-imidazolidinone or 1-methyl-3-ethyl-2-imidazolidinone. Among these compounds, 1,3-dimethyl-2-imidazolidinone is preferable.

Examples of the compound in which $R^9$ is a hydrocarbylene group among the compounds represented by Formula (I-A2) include N-hydrocarbyl-β-propiolactam such as N-methyl-β-propiolactam or N-phenyl-β-propiolactam; N-hydrocarbyl-2-pyrrolidone such as N-methyl-2-pyrrolidone, N-vinyl-2-pyrrolidone, N-phenyl-2-pyrrolidone, N-tert-butyl-2-pyrrolidone or N-methyl-5-methyl-2-pyrrolidone; N-hydrocarbyl-2-piperidone such as N-methyl-2-piperidone, N-vinyl-2-piperidone or N-phenyl-2-piperidone; N-hydrocarbyl-ε-caprolactam such as N-methyl-ε-caprolactam or N-phenyl-ε-caprolactam; and N-hydrocarbyl-ω-laurilolactam such as N-methyl-ω-laurilolactam or N-vinyl-ω-laurilolactam. Among these compounds, N-phenyl-2-pyrrolidone and N-methyl-ε-caprolactam are preferable.

The compound represented by Formula (I-A) is preferably a compound represented by (1-A3):

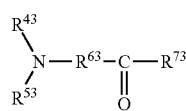

(I-A3)

wherein $R^{43}$ is an optionally substituted hydrocarbyl group, or a hydrocarbylene group which may have a nitrogen atom and/or an oxygen atom where $R^{43}$ is combined with $R^{53}$; $R^{53}$ is an optionally substituted hydrocarbyl group, or a hydrocarbylene group which may have a nitrogen atom and/or an oxygen atom where $R^{53}$ is combined with $R^{43}$; $R^{63}$ is a hydrocarbylene group; and $R^{73}$ is an optionally substituted hydrocarbyl group.

Description and examples of the optionally substituted hydrocarbyl group in Formula (I-A3) are the same as those of an optionally substituted hydrocarbyl group in Formula (I-A).

Description and examples of the hydrocarbylene group which may have a nitrogen atom and/or an oxygen atom in Formula (I-A3) are the same as those of a hydrocarbylene group which may have a nitrogen atom and/or an oxygen atom in Formula (I-A).

Examples of the hydrocarbylene group of $R^{63}$ in Formula (I-A3) include an alkanediyl group, an alkenediyl group and an arylene group. Examples of the alkanediyl group include a polymethylene group such as a trimethylene group, a tetramethylene group, a pentamethylene group or a hexamethylene group; and a 2,2,4-trimethylhexane-1,6-diyl group. Examples of the alkenediyl group include a pent-2-ene-1,5-diyl group. Examples of the arylene group include a 1,4-phenylene group.

In Formula (I-A3), $R^{63}$ is preferably a hydrocarbylene group having 1 to 10 carbon atoms, more preferably an alkanediyl group having 1 to 10 carbon atoms or an arylene group having 6 to 10 carbon atoms, still more preferably a methylene group, a polymethylene group having 2 to 6 carbon atoms or a phenylene group, and particularly preferably an ethylene group, a trimethylene group or a 1,4-phenylene group.

In Formula (I-A3), $R^{73}$ is preferably a hydrocarbyl group having 1 to 10 carbon atoms, or a substituted hydrocarbyl group having 1 to 10 carbon atoms in which a substituent is a dialkylamino group, more preferably an alkyl group having 1 to 6 carbon atoms, an aryl group having 6 to 10 carbon atoms, an alkyl group having 1 to 6 carbon atoms which has a dialkylamono group as a substituentor an aryl group having 6 to 10 carbon atoms which has a dialkylamino group as a substituent, and still more preferably a methyl group, an ethyl group, a phenyl group, a 3-dimethylaminoethyl group or a 4-diethylaminophenyl group.

In Formula (I-A3), $R^{43}$ is preferably a hydrocarbyl group having 1 to 10 carbon atoms, or a hydrocarbylene group having 3 to 10 carbon atoms which is combined with $R^{53}$ or a hydrocarbylene group having 3 to 10 carbon atoms which has a nitrogen atom or an oxygen atom and which is combined with $R^{53}$, more preferably an alkyl group having 1 to 10 carbon atoms or an aryl group having 6 to 10 carbon atoms, or an alkanediyl group having 3 to 10 carbon atoms which is combined with $R^{53}$, a group represented by —CH=N—CH=CH— which is combined with $R^{53}$, a group represented by —CH=N—$CH_2$—$CH_2$— which is combined with $R^{53}$ or a group represented by —$(CH_2)_2$—O—$(CH_2)_2$— which is combined with $R^{53}$, still more preferably an alkyl group having 1 to 6 carbon atoms, or a polymethylene group having 3 to 6 carbon atoms which is combined with $R^{53}$, a group represented by —CH=N—CH=CH— which is combined with $R^{53}$ or a group represented by —CH=N—$CH_2$—$CH_2$— which is combined with $R^{53}$ and particularly preferably a methyl group or an ethyl group, or a tetramethylene group which is combined with $R^{53}$, a hexamethylene group which is combined with $R^{53}$ or a group represented by —CH=N—CH=CH— which is combined with $R^{53}$.

In Formula (I-A3), $R^{53}$ is preferably a hydrocarbyl group having 1 to 10 carbon atoms, or a hydrocarbylene group having 3 to 10 carbon atoms which is combined with $R^{43}$, or a hydrocarbylene group having 3 to 10 carbon atoms which has a nitrogen atom or an oxygen atom and which is combined with $R^{43}$, more preferably an alkyl group having 1 to 10 carbon atoms or an aryl group having 6 to 10 carbon atoms, or an alkanediyl group having 3 to 10 carbon atoms which is combined with $R^{43}$, a group represented by —CH=N—CH=CH— which is combined with $R^{43}$, a group represented by —CH=N—$CH_2$—$CH_2$— which is combined with $R^{43}$ or a group represented by —$(CH_2)_2$—O—$(CH_2)_2$— which is combined with $R^{43}$, still more preferably an alkyl group having 1 to 6 carbon atoms, or a polymethylene group having 3 to 6 carbon atoms which is combined with $R^{43}$, a group represented by —CH=N—CH=CH— which is combined with $R^{43}$ or a group represented by —CH=N—$CH_2$—$CH_2$— which is combined with $R^{43}$, and particularly preferably a methyl group, an ethyl group, or a tetramethylene group which is combined with $R^{43}$, a hexamethylene group which is combined with $R^{43}$ or a group represented by —CH=N—CH=CH— which is combined with $R^{43}$.

Examples of the compound in which $R^{73}$ is a hydrocarbyl group among the compounds represented by Formula (I-A3) include 4-N,N-dihydrocarbylaminoacetophenone such as 4-(N,N-dimethylamino)acetophenone, 4-N-methyl-N-ethylaminoacetophenone or 4-N,N-diethylaminoacetophenone; and a 4-cyclic aminoacetophenone compound such as 4'-

(imidazol-1-yl)acetophenone or 4-pyrazolylacetophenone. Among these compounds, a 4-cyclic aminoacetophenone compound is preferable, and 4'-(imidazol-1-yl)acetophenone is more preferable.

Examples of the compound in which $R^{73}$ is a substituted hydrocarbyl group among the compounds represented by Formula (I-A3) include bis(dihydrocarbylaminoalkyl)ketone such as 1,7-bis(methylethylamino)-4-heptanone or 1,3-bis(diphenylamino)-2-propanone; 4-(dihydrocarbylamino)benzophenone such as 4-N,N-dimethylaminobenzophenone, 4-N,N-di-t-butylaminobenzophenone or 4-N,N-diphenylaminobenzophenone; 4,4'-bis(dihydrocarbylamino)benzophenone such as 4,4'-bis(dimethylamino)benzophenone, 4,4'-bis(diethylamino)benzophenone or 4,4'-bis(diphenylamino)benzophenone. Among these compounds, 4,4'-bis(dihydrocarbylamino)benzophenone is preferable, and 4,4'-bis(diethylamino)benzophenone is more preferable.

The compound represented by Formula (I-A) is preferably a compound represented by Formula (I-A4):

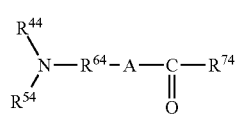

(I-A4)

wherein $R^{44}$ is an optionally substituted hydrocarbyl group, or a hydrocarbylene group which may have a nitrogen atom and/or an oxygen atom where $R^{44}$ is combined with $R^{54}$; $R^{54}$ is an optionally substituted hydrocarbyl group, or a hydrocarbylene group which may have a nitrogen atom and/or an oxygen atom where $R^{54}$ is combined with $R^{44}$; $R^{64}$ is a hydrocarbylene group; A is an oxygen atom or a group represented by —$NR^8$—; $R^8$ is a hydrocarbyl group or a hydrogen atom; and $R^{74}$ is an optionally substituted hydrocarbyl group.

Description and examples of the optionally substituted hydrocarbyl group in Formula (I-A4) are the same as those of an optionally substituted hydrocarbyl group in Formula (I-A).

In Formula (I-A4), A is an oxygen atom, or a group represented by —$NR^8$— ($R^8$ is a hydrocarbyl group or a hydrogen atom).

In the group represented by —$NR^8$—, where $R^8$ is a hydrocarbyl group, the number of carbon atom of $R^8$ is preferably from 1 to 8. In the group represented by —$NR^8$—, $R^8$ is preferably a hydrogen atom.

In Formula (I-A4), A is preferably an oxygen atom, or a group represented by —NH—, and more preferably a group represented by —NH—.

In Formula (I-A4), examples of the hydrocarbylene group of $R^{64}$ include an alkanediyl group, an alkenediyl group and an arylene group. Examples of the alkanediyl group include a polymethylene group such as a trimethylene group, a tetramethylene group, a pentamethylene group or a hexamethylene group; and a 2,2,4-trimethylhexane-1,6-diyl group. Examples of the alkenediyl group include a pent-2-ene-1,5-diyl group.

Examples of the arylene group include a 1,4-phenylene group.

In Formula (I-A4), $R^{74}$ is preferably a hydrocarbyl group having 1 to 10 carbon atoms, more preferably an alkenyl group having 2 to 5 carbon atoms, still more preferably a vinyl group or an isopropenyl group, and particularly preferably a vinyl group.

In Formula (I-A4), $R^{64}$ is preferably a hydrocarbylene group having 1 to 10 carbon atoms, more preferably a polymethylene group having 1 to 6 carbon atoms, still more preferably an ethylene group or a trimethylene group, and particularly preferably a trimethylene group.

In Formula (I-A4), $R^{44}$ is preferably a hydrocarbyl group having 1 to 10 carbon atoms, or a hydrocarbylene group having 3 to 10 carbon atoms which is combined with $R^{54}$, or a hydrocarbylene group having 3 to 10 carbon atoms which has a nitrogen atom or an oxygen atom and which is combined with $R^{54}$, more preferably alkyl group having 1 to 10 carbon atoms or an aryl group having 6 to 10 carbon atoms, or an alkanediyl group having 3 to 10 Carbon atoms which is combined with $R^{54}$, a group represented by —CH=N—CH=CH— which is combined with $R^{54}$, a group represented by —CH=N—$CH_2$—$CH_2$— which is combined with $R^{54}$, or a group represented by —$(CH_2)_2$—O—$(CH_2)_2$— which is combined with $R^{54}$, still more preferably an alkyl group having 1 to 6 carbon atoms, or a polymethylene group having 3 to 6 carbon atoms which is combined with $R^{54}$, a group represented by —CH=N—CH=CH— which is combined with $R^{54}$, or a group represented by —CH=N—$CH_2$—$CH_2$— which is combined with $R^{54}$ and particularly preferably a methyl group, an ethyl group, or a tetramethylene group which is combined with $R^{54}$, a hexamethylene group which is combined with $R^{54}$ or a group represented by —CH=N—CH=CH— which is combined with $R^{54}$.

In Formula (I-A4), $R^{54}$ is preferably a hydrocarbyl group having 1 to 10 carbon atoms, or a hydrocarbylene group having 3 to 10 carbon atoms which is combined with $R^{44}$, or a hydrocarbylene group having 3 to 10 carbon atoms which has a nitrogen atom or an oxygen atom and which is combined with $R^{44}$, more preferably an alkyl group having 1 to 10 carbon atoms or an aryl group having 6 to 10 carbon atoms, or an alkanediyl group having 3 to 10 carbon atoms which is combined with $R^{44}$, a group represented by —CH=N—CH=CH— which is combined with $R^{44}$, a group represented by —CH=N—$CH_2$—$CH_2$— which is combined with $R^{44}$ or a group represented by —$(CH_2)_2$—O—$(CH_2)_2$— which is combined with $R^{44}$, still more preferably an alkyl group having 1 to 6 carbon atoms, or a polymethylene group having 3 to 6 carbon atoms which is combined with $R^{44}$, a group represented by —CH=N—CH=CH— which is combined with $R^{44}$ or a group represented by —CH=N—$CH_2$—$CH_2$-which is combined with $R^{44}$, and particularly preferably a methyl group, an ethyl group, or a tetramethylene group which is combined with $R^{44}$, a hexamethylene group which is combined with $R^{44}$ or a group represented by —CH=N—CH=CH— which is combined with $R^{44}$.

Examples of the compound in which A is an oxygen atom among the compounds represented by Formula (I-A4) include 2-N,N-dihydrocarbylaminoethyl acrylate such as 2-N,N-dimethylaminoethyl acrylate or 2-N,N-diethylaminoethyl acrylate; 3-N,N-dihydrocarbylaminopropyl acrylate such as 3-N,N-dimethylaminopropyl acrylate; 2-N,N-dihydrocarbylaminoethyl methacrylate such as 2-N,N-dimethylaminoethyl methacrylate or 2-N,N-diethylaminoethyl methacrylate; and 3-N,N-dihydrocarbylaminopropyl methacrylate such as 3-N,N-dimethylaminopropyl methacrylate. Among these compounds, 3-N,N-dihydrocarbylaminopropyl acrylate is preferable and 3-N,N-dimethylaminopropyl acrylate is more preferable.

Examples of the compound in which A is a group represented by —$NR^8$— ($R^8$ is a hydrocarbyl group or a hydrogen atom) among the compounds represented by Formula (I-A4) include N,N-dihydrocarbylaminoethylacrylamide such as N,N-dimethylaminoethylacrylamide or N,N-diethylaminoethylacrylamide; N,N-dihydrocarbylaminopropylacrylamide such as N,N-dimethylaminopropylacrylamide or N,N-diethylaminopropylacrylamide; N,N-dihydrocarbylaminobutylacrylamide such as N,N-dimethylaminobutylacrylamide or N,N-diethylaminobutylacrylamide; N,N-dihydrocarbylaminoethylmethacrylamide such as N,N-dimethylaminoethylmethacrylamide or N,N-diethylaminoethylmethacrylamide; N,N-dihydrocarbylaminopropylmethacrylamide such as N,N-dimethylaminopropylmethacrylamide or N,N-diethylaminopropylmethacrylamide; and N,N-dihydrocarbylaminobutylmethacrylamide such as N,N-dimethylaminobutylmethacrylamide or N,N-diethylaminobutylmethacrylamide. Among these compounds, N,N-dihydrocarbylaminopropylacrylamide is preferable, and N,N-dimethylaminopropylacrylamide is more preferable.

The compound (I) is preferably a compound represented by Formula (I-A), and more preferably a compound represented by Formula (I-A4).

The compound represented by Formula (I-A4) is preferably a compound in which $R^{44}$ and $R^{54}$ are an alkyl group having 1 to 6 carbon atoms, or $R^{44}$ is combined with $R^{54}$ to form a polymethylene group having 3 to 6 carbon atoms; $R^{64}$ is a polymethylene group having 1 to 6 carbon atoms; A is an oxygen atom, or a group represented by —NH—; and $R^{74}$ is an alkenyl group having 2 to 5 carbon atoms in Formula (I-A4), and more preferably a compound in which $R^{44}$ and $R^{54}$ is a methyl group or an ethyl group; $R^{64}$ is an ethylene group or a trimethylene group; A is a group represented by —NH—; and $R^{74}$ is a vinyl group or an isopropenyl group in Formula (I-A4).

The compound (I) is particularly preferably N,N-dimethylaminoethylacrylamide, N,N-diethylaminoethylacrylamide, N,N-dimethylaminopropylacrylamide or N,N-diethylaminopropylacrylamide.

The compound (II) is a compound represented by the above-mentioned Formula (II-A).

In Formula (II-A), k, l and m are each an integer of 1 to 8. Preferably, k, l and m are each an integer of 1 to 5, and more preferably an integer of 2 to 4.

In Formula (II-A), $R^1$, $R^2$, $R^3$, $R^{11}$, $R^{12}$, $R^{13}$, $R^{14}$, $R^{15}$ and $R^{16}$ are each independently a hydrocarbyloxy group or a hydrocarbyl group; at least one group selected from among $R^1$, $R^2$ and $R^3$ is a hydrocarbyloxy group; at least one group selected from among $R^{11}$, $R^{12}$ and $R^{13}$ is a hydrocarbyloxy group; and at least one group selected from among $R^{14}$, $R^{15}$ and $R^{16}$ is a hydrocarbyloxy group.

The number of carbon atom of each of $R^1$, $R^2$, $R^3$, $R^{11}$, $R^{12}$, $R^{13}$, $R^{14}$, $R^{15}$ and $R^{16}$ is preferably from 1 to 8, more preferably from 1 to 5, and still more preferably 1 or 2.

Examples of the hydrocarbyloxy group include an alkoxy group such as a methoxy group, an ethoxy group, a n-propoxy group or a n-butoxy group; and an aryloxy group such as a phenoxy group. Examples of the hydrocarbyl group include an alkyl group such as a methyl group, an ethyl group, a n-propyl group, an isopropyl group or a n-butyl group; an alkenyl group such as a vinyl group, an allyl group or an isopropenyl group; and an aryl group such as a phenyl group.

The hydrocarbyloxy group is preferably an alkoxy group having 1 to 8 carbon atoms, more preferably an alkoxy group having 1 to 5 carbon atoms, and still more preferably a methoxy group or an ethoxy group.

Preferably, at least two groups selected from among $R^1$, $R^2$ and $R^3$ are a hydrocarbyloxy group; at least two groups selected from among $R^{11}$, $R^{12}$ and $R^{13}$ are a hydrocarbyloxy group; and at least two groups selected from among $R^{14}$, $R^{15}$ and $R^{16}$ are a hydrocarbyloxy group.

More preferably, $R^1$, $R^2$, $R^3$, $R^{11}$, $R^{12}$, $R^{13}$, $R^{14}$, $R^{15}$ and $R^{16}$ are each independently a hydrocarbyloxy group.

Two or more groups selected from among $R^1$, $R^2$, $R^3$, $R^{11}$, $R^{12}$, $R^{13}$, $R^{14}$, $R^{15}$ and $R^{16}$ may be the same or different.

Examples of the compound (II) include 1,3,5-tris(3-trimethoxysilylpropyl) isocyanurate, 1,3,5-tris(3-triethoxysilylpropyl) isocyanurate, 1,3,5-tris(3-tripropoxysilylpropyl) isocyanurate and 1,3,5-tris(3-tributoxysilylpropyl) isocyanurate. The compound (II) is preferably 1,3,5-tris(3-trimethoxysilylpropyl) isocyanurate.

The amount of the compound (I) to be added to a hydrocarbon solvent is preferably 0.01 mol or more, more preferably 0.02 mol or more, and still more preferably 0.05 mol or more, per mol of the amount of the organoalkali metal compound used in the polymerization of monomers. The amount of the compound (I) is preferably 0.9 mol or less, more preferably 0.6 mol or less, and still more preferably 0.2 mol or less, per mol of the amount of the organoalkali metal compound used in the polymerization of monomers.

The amount of the compound (II) to be added to a hydrocarbon solvent is preferably 0.01 mol or more, more preferably 0.1 mol or more, and still more preferably 0.2 mol or more, per mol of the amount of the organoalkali metal compound used in the polymerization of monomers. The amount of the compound (II) is preferably 0.9 mol or less, more preferably 0.7 mol or less, and still more preferably 0.5 mol or less, per mol of the amount of the organoalkali metal compound used in the polymerization of monomers.

The amounts of the compounds (I) and (II) are amounts which satisfy the value $X_R$, defined by the below-mentioned Formula (1), of preferably 1 or more, more preferably 10 or more, and still more preferably 20 or more.

The amounts of the compounds (I) and (II) are amounts which satisfy the value $X_R$ of preferably 50 or less, more preferably 45 or less, and still more preferably 40 or less.

$$X_R = X(II) \times y / X(I) \tag{1}$$

where X (I) in Formula (1) denotes the amount of the compound (I) (unit: mol) to be added in a hydrocarbon solvent, X (II) denotes the amount of the compound (II) (unit: mol) to be added in a hydrocarbon solvent, and y denotes the number of hydrocarbyloxy groups contained in Formula (II-A).

After addition of the compounds (I) and (II) in the hydrocarbon solvent, the compounds (I) and (II) are reacted with the alkali-metallized polymer chain ends. The reaction temperature is usually from 25° C. to 100° C., preferably from 35° C. to 90° C., and more preferably from 50° C. to 80° C. The reaction time is usually from 60 seconds to 5 hours, and preferably from 5 minutes to 1 hour.

Preferred is a method in which, first, the compound (I) is added in a hydrocarbon solvent and the compound (I) is reacted with the alkali-metallized polymer chain end, and then the compound (II) is added in the solvent and the compound (II) is reacted with the alkali-metallized polymer chain end. A method in which 60 seconds to 5 hours after addition of the compound (I), the compound (II) is added in the solvent is preferable.

<Coupling>

In the method of the present invention, the alkali-metallized polymer chain end may be reacted with a coupling agent thereby to perform coupling of polymer chains until the below-mentioned polymer chain end inactivation of the modified conjugated diene-based polymer from initiation of the polymerization of monomers. Coupling is usually carried out by adding, in a hydrocarbon solvent containing a conjugated diene-based polymer, a coupling agent represented by the below-mentioned Formula (III):

$$R^{10}{}_a ML_{4-a} \tag{III}$$

wherein $R^{10}$ is an alkyl group, an alkenyl group, a cycloalkenyl group or an aryl group; M is a silicon atom or a tin atom; L is a halogen atom or a hydrocarbyloxy group; and a is an integer of 0 to 2.

Examples of the coupling agent represented by the above-mentioned Formula (III) include silicon tetrachloride, methyltrichlorosilane, dimethyldichlorosilane, tin tetrachloride, methyltrichlorotin, dimethyldichlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, diethoxydiethylsilane and the like.

The amount of the coupling agent to be added is preferably 0.03 mol or more, and more preferably 0.05 mol or more, per mol of the organoalkali metal compound to be used in the polymerization. The amount of the coupling agent is preferably 0.4 mol or less, and more preferably 0.3 mol or less, per mol of the organoalkali metal compound to be used in the polymerization.

<Polymer Chain End Inactivation and Recovery of Modified Conjugated Diene-Based Polymer>

In the method for producing a conjugated diene-based polymer of the present invention, polymer chain ends may be inactivated by adding an alcohol such as methanol, isopropyl alcohol or 1-butanol in a hydrocarbon solvent after adding the compounds (I) and (II) in a hydrocarbon solvent containing a conjugated diene-based polymer to obtain a modified conjugated diene-based polymer and before recovery of the below-mentioned modified conjugated diene-based polymer.

A known method can be used as the method of recovering the modified conjugated diene-based polymer from the hydrocarbon solvent containing a modified conjugated diene-based polymer, and examples thereof include a method in which a coagulating agent is added in the solvent, a method in which steam is added in the solvent and the like. The recovered modified conjugated diene-based polymer may be dried by a known dryer such as a band dryer or an extrusion type dryer.

<Modified Conjugated Diene-Based Polymer>

The modified conjugated diene-based polymer can be obtained by the above method.

Mooney viscosity ($ML_{1+4}$) of the modified conjugated diene-based polymer is preferably 10 or more, and more preferably 20 or more, so as to enhance the tensile strength of a polymer. In order to enhance processability of a polymer, Mooney viscosity is preferably 200 or less, and more preferably 150 or less. The Mooney viscosity ($ML_{1+4}$) is measured at 100° C. in accordance with JIS K6300 (1994).

In the modified conjugated diene-based polymer, the amount of the monomer unit derived from the conjugated diene compound is preferably 50% by weight or more, and more preferably 55% by weight or more, based on 100% by weight of the entire polymer. The amount of the monomer unit derived from the conjugated diene compound is preferably 90% by weight or less, and more preferably 85% by weight or less, based on 100% by weight of the entire polymer.

The modified conjugated diene-based polymer preferably contains a monomer unit derived from an aromatic vinyl compound so as to enhance the tensile strength of a polymer. Examples of the aromatic vinyl compound include the above-mentioned aromatic vinyl compounds. The amount of the monomer unit derived from an aromatic vinyl compound contained in the modified conjugated diene-based polymer is preferably 10% by weight or more, and more preferably 15% by weight or more, based on 100% by weight of the entire polymer. In order to enhance fuel economy, the amount of the monomer unit derived from an aromatic vinyl compound is preferably 50% by weight or less, and more preferably 45% by weight or less, based on 100% by weight of the entire polymer.

The vinyl bond content in the modified conjugated diene-based polymer is preferably 80 mol % or less, and more preferably 70 mol % or less, based on 100 mol % of the amount of monomer unit derived from the conjugated diene compound contained in the modified conjugated diene-based polymer so as to enhance fuel economy. In order to enhance grip performance, the vinyl bond content is preferably 10 mol % or more, more preferably 15 mol % or more, still more preferably 20 mol % or more, and particularly preferably 40 mol % or more, based on 100 mol % of the amount of monomer unit derived from the conjugated diene compound contained in the modified conjugated diene-based polymer. The vinyl bond content is determined by infrared spectrophotometry from an absorption intensity at about 910 $cm^{-1}$ which is an absorption peak of a vinyl group.

<Polymer Composition>

The modified conjugated diene-based polymer obtained by the method of the present invention can be used mixed with other polymer Components and additives and the mixture can be used as a polymer composition.

Examples of the other polymer component include a styrene-butadiene copolymer, a polybutadiene, a butadiene-isoprene copolymer, a butyl rubber, a natural rubber, an ethylene-propylene copolymer and an ethylene-octene copolymer. One or more kinds of these polymer components are used.

In case of mixing the modified conjugated diene-based polymer with other polymer components, the amount of the modified conjugated diene-based polymer to be mixed is preferably 10% by weight or more, and more preferably 20% by weight or more, based on 100% by weight of the total of the modified conjugated diene-based polymer and other polymer components so as to enhance fuel economy.

Examples of the additive include a vulcanizing agent, a vulcanization accelerator, a vulcanization activator, an organic peroxide, a reinforcing agent, a filler, a silane coupling agent, an extender oil, a processing aid, an antioxidant, a lubricant and the like.

It is preferred to produce a vulcanizable polymer by kneading a modified conjugated diene-based polymer with a vulcanizing agent. Examples of the vulcanizing agent include sulfur. Examples of the sulfur include powdered sulfur, precipitated sulfur, colloidal sulfur, insoluble sulfur, highly dispersible sulfur and the like. The amount of the vulcanizing agent to be kneaded with the modified conjugated diene-based polymer is preferably from 0.1 part by weight to 15 parts by weight, more preferably from 0.3 part by weight to 10 parts by weight, and still more preferably from 0.5 part by weight to 5 parts by weight, based on 100 parts by weight of the total amount of the modified conjugated diene-based polymer and other polymer component.

Examples of the vulcanization accelerator include a thiazole-based vulcanization accelerator such as 2-mercaptobenzothiazole or dibenzothiazyl disulfide; a thiuram-based vulcanization accelerator such as tetramethylthiuram monosulfide or tetramethylthiuram disulfide; a sulfenamide-based vulcanization accelerator such as N-cyclohexyl-2-benzothiazolesulfenamide, N-tert-butyl-2-benzothiazolesulfenamide, N-oxyethylene-2-benzothiazolesulfenamide or N,N-diisopropyl-2-benzothiazolesulfenamide; and a guanidine-based vulcanization accelerator such as diphenylguanidine, diorthotolylguanidine or orthotolylbiguanidine. The amount of the vulcanization accelerator to be kneaded with the modified conjugated diene-based polymer is preferably from 0.1 part by weight to 5 parts by weight, and more preferably from 0.2 part by weight to 3 parts by weight, based on 100 parts by weight of the polymer component.

Examples of the vulcanization activator include stearic acid, zinc oxide and the like. Examples of the organic peroxide include dicumyl peroxide, di-tert-butyl peroxide and the like.

Examples of the reinforcing agent include a silica-based reinforcing agent and carbon black.

Examples of the silica-based reinforcing agent include dry silica (silicic anhydride), wet silica (hydrated silicic acid), colloidal silica, precipitated silica, calcium silicate and aluminum silicate. One or more kinds of these silica-based reinforcing agents can be used. BET specific surface area of the silica-based reinforcing agent is preferably from 50 $m^2/g$ to 250 $m^2/g$. The BET specific surface area is measured in accordance with ASTM D1993-03. It is possible to use commercially available products manufactured by Degussa AG under the trade of ULTRASIL VN3-G, commercially available products manufactured by Tosoh Silica Corporation under the trade names of VN3, AQ, ER and RS-150, and commercially available products manufactured by Rhodia under the trade names of Zeosil 1115 MP and 1165 MP.

Examples of the carbon black include channel carbon black such as EPC, MPC or CC; furnace carbon black such as SAF, ISAF, HAF, MAF, FEF, SRF, GPF, APF, FF, CF, SCF or ECF; thermal carbon black such as FT or MT; acetylene carbon black; and graphite. One or more kinds of these carbon blacks can be used.

Nitrogen adsorption specific surface area ($N_2$ SA) of carbon black is preferably from 5 $m^2/g$ to 200 $m^2/g$, and dibutyl phthalate (DBP) absorption of carbon black is preferably from 5 ml/100 g to 300 ml/100 g. The nitrogen adsorption specific surface area is measured in accordance with ASTM D4820-93, and the DBP absorption is measured in accordance with ASTM D2414-93. It is possible to use commercially available products manufactured by Mitsubishi Chemical Corporation under the trade name of DIABLACK N339, commercially available products manufactured by TOKAI CARBON CO., LTD. under the trade names of SEAST 6, SEAST 7HM and SEAST KH, and commercially available products manufactured by Degussa AG under the trade names of CK 3 and Special Black 4A.

It is preferred to produce a vulcanizable polymer by kneading a reinforcing agent in the amount of 10 to 150 parts by weight based on 100 parts by weight of a modified conjugated diene-based polymer, together with the modified conjugated diene-based polymer and a vulcanizing agent. The amount of the reinforcing agent is more preferably 20 parts by weight or more, and still more preferably 30 parts by weight or more, based on 100 parts by weight of a modified conjugated diene-based polymer, so as to enhance abrasion resistance and strength. In order to enhance reinforcement, the amount of the reinforcing agent is more preferably 120 parts by weight or less, and still more preferably 100 parts by weight or less, based on 100 parts by weight of a modified conjugated diene-based polymer.

In order to enhance fuel economy, a silica-based reinforcing agent is preferably used as the reinforcing agent. The amount of the silica-based reinforcing agent is preferably 50% by weight or more, and more preferably 70% by weight or more, based on 100% by weight of the total amount of the reinforcing agent to be mixed.

In case of kneading a silica-based reinforcing agent and carbon black, together with a modified conjugated diene-based polymer and a vulcanizing agent so as to produce a vulcanizable polymer, a weight ratio of the amount of the silica-based reinforcing agent to that of the carbon black (amount of silica:amount of carbon black) is preferably from 2:1 to 50:1. The weight ratio is more preferably from 5:1 to 20:1 so as to enhance fuel economy and to enhance reinforcement.

Examples of the filler include calcium carbonate, talc, alumina, clay, aluminum hydroxide, mica and the like.

Examples of the silane coupling agent include vinyltrichlorosilane, vinyltriethoxysilane, vinyltris(β-methoxyethoxy) silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl) tetrasulfide, γ-trimethoxysilylpropyldimethylthiocarbamyl tetrasulfide, γ-trimethoxysilylpropylbenzothiazyltetrasulfideandthelike. One or more kinds of these silane coupling agents are used. It is possible to use commercially available product manufactured by Degussa AG under the trade names of Si169 and Si75.

In case of kneading a silane coupling agent, together with a modified conjugated diene-based polymer, a vulcanizing agent and a silica reinforcing agent, the amount of the silane coupling agent is preferably from 1 part by weight to 20 parts by weight, more preferably from 2 parts by weight to 15 parts by weight, and still more preferably from 5 parts by weight to 10 parts by weight, per 100 parts by weight of the silica reinforcing agent.

Examples of the extender oil include an aromatic mineral oil (viscosity gravity constant (V. G. C.) of 0.900 to 1.049), a naphthene-based mineral oil (V. G. C. of 0.850 to 0.899), a paraffin-based mineral (V. G. C. of 0.790 to 0.849) and the like. The polycyclic aromatic content of the extender oil is preferably less than 3% by weight, and more preferably less than 1% by weight. The polycyclic aromatic content is measured in accordance with IP346/92 of Institute of Petroleum. The content of an aromatic compound (CA) of the extender oil is preferably 20% by weight or more. One or more kinds of these extender oils are used.

Examples of the kneader to be used for the production of a vulcanizable polymer include a roll kneader, a Banbury mixer and the like.

Regarding kneading conditions in case of kneading using a kneader, the kneading temperature is usually from 50° C. to 200° C. and preferably from 80° C. to 190° C., in case of kneading additives other than a vulcanizing agent and a vulcanization accelerator. In the case of kneading a vulcanizing agent and a vulcanization accelerator, the kneading temperature is usually 100° C. or lower, and preferably from room temperature to 80° C. The kneading time is usually from 30 seconds to 30 minutes, and preferably from 1 minute to 30 minutes.

A vulcanized polymer is obtained by heating a vulcanizable polymer. Examples of the method of heating a vulcanizable polymer include a press vulcanization method. The vulcanization temperature is usually from 120° C. to 200° C., and preferably from 140° C. to 180° C.

The vulcanized polymer of the present invention is superior in fuel economy and is suitably used in a tire.

EXAMPLES

Physical properties were evaluated by the following procedures.

1. Mooney Viscosity ($ML_{1+4}$)

Mooney viscosity of a polymer was measured at 100° C. in accordance with JIS K6300 (1994).

2. Vinyl Bond Content (Unit: mol %)

Vinyl bond content of a polymer was determined by infrared spectrophotometry from an absorption intensity at about 910 $cm^{-1}$, which is the absorption peak of a vinyl group.

3. Content of Monomer Unit Derived from Styrene (Unit:% by Weight)

Content of a monomer unit derived from styrene was determined from a refractive index in accordance with JIS K6383 (1995).

4. Fuel Economy

A strip-shaped specimen measuring 4 mm in width, 40 mm in length and 1.2 mm in thickness was punched out from a sheet formed of a vulcanized polymer, and then subjected to a test. Loss tangent at a temperature of 70° C. (tanδ (70° C.)) was measured by a viscoelasticity analyzer (manufactured by Ueshima Seisakusho Company Ltd.) under the conditions of strain of 1% and frequency of 10 Hz. The smaller the value, the more fuel economy is superior.

5. Grip Performance

A strip-shaped specimen measuring 4 mm in width, 40 mm in length and 1.2 mm in thickness was punched out from a sheet formed of a vulcanized polymer, and then subjected to a test. Loss tangent at a temperature of 0° C. (tan δ (0° C.)) was measured by a viscoelasticity analyzer (manufactured by Ueshima Seisakusho Company Ltd.) under the conditions of strain of 1% and frequency of 10 Hz. The larger the value, the more grip performance is superior.

Example 1

A polymerization reactor made of stainless steel (having an inner volume of 30 liter) equipped with a stirrer was washed and dried, and then the atmosphere in the reactor was replaced by dry nitrogen. Next, 15.3 kg of industrial hexane (having a density of 680 kg/m$^3$), 840 g of 1,3-butadiene, 360 g of styrene, 9.1 ml of tetrahydrofuran and 1.4 ml of ethylene glycol diethyl ether were charged in the polymerization reactor. Next, an n-hexane solution (n-butyllithium content: 15.8 mmol) of n-butyllithium was charged in the polymerization reactor and the polymerization reaction was initiated.

While continuously supplying 1,3-butadiene and styrene in the polymerization reactor at a stirring speed of 130 rpm, and a temperature in the polymerization reactor of 65° C., 1,3-butadiene and styrene were copolymerized for 3 hours. The amount of 1,3-butadiene supplied was 1,260 g and the amount of styrene supplied was 540 g.

In the polymerization reactor, 1.6 mmol (0.10 mol per mol of n-butyllithium) of N,N-dimethylaminopropylacrylamide was charged, and components in the polymerization reactor were stirred for 15 minutes.

Next, 6.5 mmol (0.41 mol per mol of n-butyllithium) of 1,3,5-tris(3-trimethoxysilylpropyl)isocyanurate was charged in the polymerization reactor, and components in the polymerization reactor were stirred for 15 minutes.

In the polymerization reactor, 20 ml of a hexane solution containing 4.0 ml of methanol was charged, and components in the polymerization reactor were stirred for 5 minutes. The stirred material in the polymerization reactor was drawn, followed by the addition of 12.0 g of 2-tert-butyl-6-(3-tert-butyl-2-hydroxy-5-methylbenzyl)-4-methylphenylacrylate (manufactured by Sumitomo Chemical Company, Limited under the trade name of SUMILIZER GM) and 6.0 g of pentaerythrityltetrakis(3-laurylthiopropionate) (manufactured by Sumitomo Chemical Company, Limited under the trade name of SUMILIZER TP-D) to the stirred material to obtain a mixture. The mixture was left to stand at room temperature for 16 hours and the solvent was vaporized to obtain a polymer. Thereafter, the obtained polymer was further dried under reduced pressure at 55° C. for 6 hours. The evaluation results of the polymer are shown in Table 1.

A vulcanizable polymer was obtained by kneading 100 parts by weight of the obtained polymer, 78.4 parts by weight of silica (manufactured by Degussa AG under the trade name of ULTRASIL VN3-G), 6.4 parts by weight of a silane coupling agent (manufactured by Degussa AG under the trade name of Si69), 6.4 parts by weight of carbon black (manufactured by Mitsubishi Chemical Corporation under the trade name of DIABLACK N339), 47.6 parts by weight of an extender oil (manufactured by Japan Energy Corporation under the trade name of JOMO PROCESS NC-140), 1.5 parts by weight of an antioxidant (manufactured by Sumitomo Chemical Company, Limited under the trade name of ANTIGENS 3C), 2 parts by weight of stearic acid, 2 parts by weight of zinc oxide, 1 part by weight of a vulcanization accelerator (manufactured by Sumitomo Chemical Company, Limited under the trade name of SOXINOL CZ), 1 part by weight of a vulcanization accelerator (manufactured by Sumitomo Chemical Company, Limited under the trade name of SOXINOL D), 1.5 parts by weight of a wax (manufactured by OUCHI SHINKO CHEMICAL INDUSTRIAL CO., Ltd. under the trade name of SUNNOC N) and 1.4 parts by weight of sulfur, using a laboplasto mill. The obtained vulcanizable polymer was formed into a sheet by a 6 inch roll and the sheet was vulcanized by heating at 160° C. for 45 minutes to obtain a sheet made of 150 mm in width, 150 mm in depth and 1.2 mm in thickness of the vulcanized polymer. The evaluation results of physical properties of the sheet made of the vulcanized polymer are shown in Table 1.

Comparative Example 1

In the same manner as in Example 1, except that N,N-dimethylaminopropylacrylamide was not charged in the polymerization reactor, the operation was carried out. The evaluation results of the obtained polymer and physical properties of the sheet made of the vulcanized polymer are shown in Table 1.

Comparative Example 2

In the same manner as in Example 1, except that 1,3,5-tris(3-trimethoxysilylpropyl)isocyanurate was not charged in the polymerization reactor, the operation was carried out. The evaluation results of the obtained polymer and physical properties of the sheet made of the vulcanized polymer are shown in Table 1.

Comparative Example 3

In the same manner as in Example 1, except that the amount of N,N-dimethylaminopropylacrylamide to be charged in the polymerization reactor was changed to 15.8 mmol (1.0 mol per mol of n-butyllithium) and 1,3,5-tris (3-trimethoxysilylpropyl)isocyanurate was not charged, the operation was carried out.

The evaluation results of the obtained polymer and physical properties of the sheet made of the vulcanized polymer are shown in Table 1.

Example 2

A polymerization reactor made of stainless steel (having an inner volume of 30 liter) equipped with a stirrer was washed and dried, and then the atmosphere in the reactor was replaced by nitrogen. Next, 15.3 kg of industrial hexane (having a density of 680 kg/m$^3$), 960 g of 1,3-butadiene, 9.1 ml of tetrahydrofuran and 1.4 ml of ethylene glycol diethyl ether were charged in the polymerization reactor. Next, an n-hexane solution (n-butyllithium content: 13.3 mmol) of n-butyllithium was charged in the polymerization reactor and the polymerization reaction was initiated.

While continuously supplying 1,3-butadiene in the polymerization reactor at a stirring speed of 130 rpm, and a temperature in the polymerization reactor of 70° C., the polymerization reaction of 1,3-butadiene was carried out for 3 hours. The amount of 1,3-butadiene supplied was 1,440 g.

In the polymerization reactor, 1.3 mmol (0.10 mol per mol of n-butyllithium) of N,N-dimethylaminopropylacrylamide was charged, and components in the polymerization reactor were stirred for 15 minutes.

Next, 5.3 mmol (0.40 mol per mol of n-butyllithium) of 1,3,5-tris(3-trimethoxysilylpropyl)isocyanurate was charged in the polymerization reactor, and components in the polymerization reactor were stirred for 15 minutes.

In the polymerization reactor, 20 ml of a hexane solution containing 4.0 ml of methanol was charged, and components in the polymerization reactor were stirred for 5 minutes. The stirred material in the polymerization reactor was drawn, followed by the addition of 12.0 g of 2-tert-butyl-6-(3-tert-butyl-2-hydroxy-5-methylbenzyl)-4-methylphenylacrylate (manufactured by Sumitomo Chemical Company, Limited under the trade name of SUMILIZER GM) and 6.0 g of pentaerythrityltetrakis(3-laurylthiopropionate) (manufactured by Sumitomo Chemical Company, Limited under the trade name of SUMILIZER TP-D) to the stirred material to obtain a mixture. The mixture was left to stand at room temperature for 16 hours and the solvent was vaporized to obtain a polymer. Thereafter, the obtained polymer was further dried under reduced pressure at 55° C. for 6 hours. The evaluation results of the polymer are shown in Table 1.

A vulcanizable polymer was obtained by kneading 100 parts by weight of the obtained polymer, 78.4 parts by weight of silica (manufactured by Degussa AG under the trade name of ULTRASIL VN3-G), 6.4 parts by weight of a silane coupling agent (manufactured by Degussa AG under the trade name of Si69), 6.4 parts by weight of carbon black (manufactured by Mitsubishi Chemical Corporation under the trade name of DIABLACK N339), 47.6 parts by weight of an extender oil (manufactured by Japan Energy Corporation under the trade name of JOMO PROCESS NC-140), 1.5 parts by weight of an antioxidant (manufactured by Sumitomo Chemical Company, Limited under the trade name of ANTIGENE 3C), 2 parts by weight of stearic acid, 2 parts by weight of zinc oxide, 1 part by weight of a vulcanization accelerator (manufactured by Sumitomo Chemical Company, Limited under the trade name of SOXINOL CZ), 1 part by weight of a vulcanization accelerator (manufactured by Sumitomo Chemical Company, Limited under the trade name of SOXINOL D), 1.5 parts by weight of a wax (manufactured by OUCHI SHINKO CHEMICAL INDUSTRIAL CO., LTD. under the trade name of SUNNOC N) and 1.4 parts by weight of sulfur, using a laboplasto mill. The obtained vulcanizable polymer was formed into a sheet by a 6 inch roll and the sheet was vulcanized by heating at 160° C. for 45 minutes to obtain a sheet made of 150 mm in width, 150 mm in depth and 1.2 mm in thickness of the vulcanized polymer. The evaluation results of physical properties of the sheet made of the vulcanized polymer are shown in Table 1.

TABLE 1

|  |  | Example 1 | Comparative Example 1 | Comparative Example 2 | Comparative Example 3 | Example 2 |
|---|---|---|---|---|---|---|
| Mooney viscosity | — | 65 | 91 | 72 | 28 | 86 |
| Vinyl bond content | Mol % | 34 | 34 | 33 | 35 | 37 |
| Content of monomer unit derived from styrene | % by weight | 29 | 29 | 29 | 30 | 0 |
| Fuel economy tanδ (70° C.) | — | 0.135 | 0.146 | 0.189 | 0.182 | 0.124 |
| Grip performance tanδ (0° C.) | — | 0.493 | 0.484 | 0.489 | 0.470 | 0.231 |

What is claimed is:

1. A method for producing a modified conjugated diene-based polymer, wherein the method comprises:

a first step of producing a conjugated diene-based polymer by polymerizing monomers comprising a conjugated diene compound in a hydrocarbon solvent using an organoalkali metal compound and a second step of adding (I) a compound having a carbonyl group and a substituted amino group and (II) a compound represented by Formula (II-A) to a hydrocarbon solvent containing the conjugated diene-based polymer:

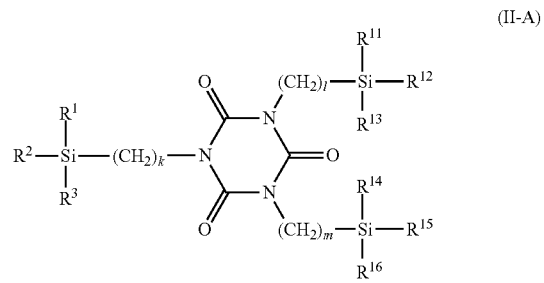

(II-A)

wherein k, l and m are each an integer of 1 to 8; $R^1$, $R^2$, $R^3$, $R^{11}$, $R^{12}$, $R^{13}$, $R^{14}$, $R^{15}$, and $R^{16}$ are each independently a hydrocarbyloxy group or a hydrocarbyl group; at least one group selected from among $R^1$, $R^2$ and $R^3$ is a hydrocarbyloxy group; at least one group selected from among $R^{11}$, $R^{12}$ and $R^{13}$ is a hydrocarbyloxy group; and at least one group selected from among $R^{14}$, $R^{15}$ and $R^{16}$ is a hydrocarbyloxy group.

2. The method according to claim 1, wherein the compound (I) is a compound represented by Formula (I-A):

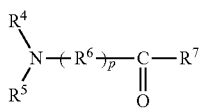

wherein $R^4$ is an optionally substituted hydrocarbyl group, a hydrocarbylene group which may have a nitrogen and/or an oxygen atom where $R^4$ is combined with $R^5$, or a divalent group where $R^4$ is combined with $R^7$; $R^5$ is an optionally substituted hydrocarbyl group or a hydrocarbylene group which may have a nitrogen and/or an oxygen atom where $R^5$ is combined with $R^4$; $R^7$ is an optionally substituted hydrocarbyl group, a hydrogen atom or a divalent group where $R^7$ is combined with $R^4$; and $R^6$ is a divalent group; p is 0 or 1.

3. The method according to claim 1, wherein in the second step, the compound (I) is added to the solvent and then the compound (II) is added to the solvent.

4. The method according to claim 1, wherein the amount of the compound (I) to be added to the solvent per mol of the organoalkali metal compound to be used is from 0.01 to 0.9 mol, and the amount of the compound (II) to be added to the solvent per mol of the organoalkali metal compound to be used is from 0.01 to 0.9 mol.

5. A method for producing a vulcanizable polymer, the method comprising kneading a modified conjugated diene-based polymer produced by the method according to claim 1, and a vulcanizing agent in an amount of from 0.1 to 15 parts by weight per 100 parts by weight of the modified conjugated diene-based polymer.

6. The method according to claim 5, wherein a reinforcing agent in an amount of from 10 to 150 parts by weight per 100 parts by weight of the modified conjugated diene-based polymer is kneaded together with the modified conjugated diene-based polymer and the vulcanizing agent.

7. A method for producing a vulcanized polymer, the method comprising heating a vulcanizable polymer produced by the method according to claim 5.

* * * * *